United States Patent [19]

Maiers

[11] 4,360,844
[45] Nov. 23, 1982

[54] HEAD INTERLOCK MECHANISM

[75] Inventor: Michael A. Maiers, Sunnyvale, Calif.

[73] Assignee: Xerox Corporation, Stamford, Conn.

[21] Appl. No.: 159,261

[22] Filed: Jun. 13, 1980

[51] Int. Cl.³ .............................................. G11B 5/016
[52] U.S. Cl. .................................................... 360/99
[58] Field of Search ........................... 360/99, 97, 105;
206/444

[56] References Cited

U.S. PATENT DOCUMENTS

| | | | |
|---|---|---|---|
| 3,702,997 | 11/1972 | Jamieson | 360/105 |
| 3,770,908 | 11/1973 | Craggs | 360/97 |
| 3,797,033 | 3/1974 | Prieur | 360/105 |
| 3,975,774 | 8/1976 | Helbers | 360/99 |
| 4,179,718 | 12/1979 | Rolph | 360/99 |
| 4,253,125 | 2/1981 | Kanamuller | 360/99 |

OTHER PUBLICATIONS

IBM Tech. Disc. Bull., Bosier, Door Opening Mechanism for Magnetic Disk Cartridge, vol. 22, No. 6, Nov. 1979, pp. 2501-2503.

*Primary Examiner*—Alfred H. Eddleman
*Attorney, Agent, or Firm*—Leonard Zalman

[57] ABSTRACT

A disc drive including a rotatable interlock mechanism which, in the absence of disc insertion, maintains separation between adjacent read/write heads regardless of the position of the door latch of the disc drive. With no disc inserted and with the door latch closed, the interlock mechanism is held by a soft spring in a support position which limits movement of the moveable head support arm toward the fixed head such that contact between the heads cannot occur. Upon opening of the door latch, to facilitate disc insertion, the moveable head is lifted to a position further from the fixed head due to the disc clamping assembly contacting the protruding finger of the moveable head support arm. When a disc is inserted into the drive, an edge of the disc (actually the disc jacket) contacts a portion of the interlock mechanism and rotates the interlock mechanism to a neutral position in which it no longer supports the moveable head support arm, whereby, upon closure of the door latch the heads can load against the opposing surfaces of the inserted disc. Upon withdrawal of the disc, the interlock mechanism is free to rotate under the action of the soft spring from its neutral position to its support position.

3 Claims, 5 Drawing Figures

HEAD INTERLOCK MECHANISM

BACKGROUND OF THE INVENTION

In recent years, floppy discs have been introduced that utilize both planar surfaces thereof for information storage. Disc drives for such floppy discs utilize a pair of adjacent heads which are mounted on a carriage adapted to move the heads transversely across the disc whereby all of the tracks on both sides of the disc can be accessed. Generally, one of the heads is rigidly supported, while the other head is flexure mounted to a support arm that is cantilever mounted to the carriage by a flat flexure spring. A tensioned spring biases the cantilevered support arm downwardly toward the rigid or fixed head.

The door latch of the disc drive is coupled to a cantilever mounted disc clampling assembly. When the door latch is moved into its open position, the disc clampling assembly is in its upper position. In that position, the disc clamping assembly contacts a protruding finger of the cantilevered head support arm producing an upward force on the cantilevered support arm of sufficient magnitude to overcome the downward force of the tensioned spring whereby the support arm is lifted away from the fixed head. After a disc has been inserted between the heads, the door latch is closed. Such closure causes the disc clamping assembly to move to its lower position wereby it is disengaged from contact with the finger of the head support arm, permitting the tensioned spring to effect movement of the moveable head support arm toward the fixed head whereby the heads are loaded against opposing surfaces of the disc.

For several reasons, such as keeping dust or other contaminants out of the disc drive or facilitating shipment, it often occurs that the door latch of the disc drive is closed without a disc being inserted into the drive. Such closure without disc insertion causes portions of the heads to contact each other, and those contacting portions are generally flat. Due to that head geometry, molecular attraction forces may cause the heads to wring or stick together should they contact. Wringing of the heads may also result if a lubricant is present on the flat surfaces of the heads. Wringing of the heads is undesirable since a subsequent attempt to separate the heads may cause the moveable head to separate from its flexure mount.

SUMMARY OF THE INVENTION

The disc drive of the invention includes a rotatable interlock mechanism which, in the absence of disc insertion, maintains separation between adjacent read/write heads regardless of the position of the door latch of the disc drive. With no disc inserted and with the door latch closed, the interlock mechanism is held by a soft spring in a support position which limits movement of the moveable head support arm toward the fixed head such that contact between the heads cannot occur. Upon opening of the door latch, to facilitate disc insertion, the moveable head is lifted to a position further from the fixed head due to the disc clamping assembly contacting the protruding finger of the moveable head support arm. When a disc is inserted into the drive, an edge of the disc (actually the disc jacket) contacts a portion of the interlock mechanism and rotates the interlock mechanism to a neutral position in which it no longer supports the moveable head support arm, whereby, upon closure of the door latch the heads can load against the opposing surfaces of the inserted disc. Upon withdrawal of the disc, the interlock mechanism is free to rotate under the action of the soft spring from its neutral position to its support position.

DETAILED DESCRIPTION OF THE INVENTION

Figure 1:
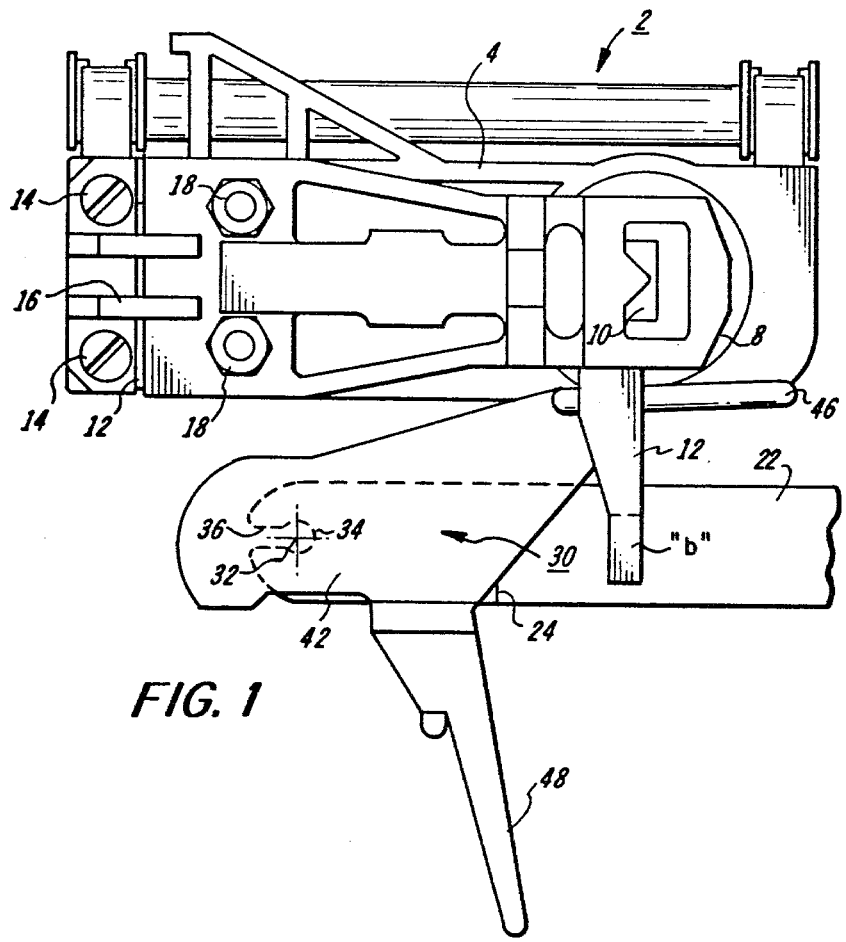
FIG. 1 is a top view of a portion of a disc drive including the head interlock mechanism of the invention.
Figure 2:
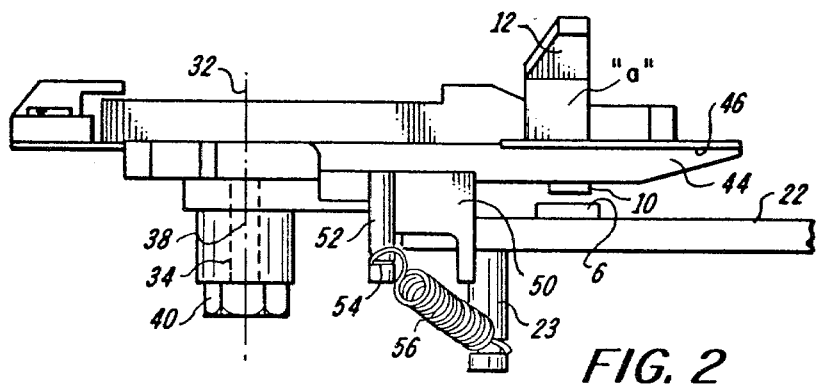
FIG. 2 is a side view of the portion of the disc drive of FIG. 1 with no disc inserted.
Figure 3:
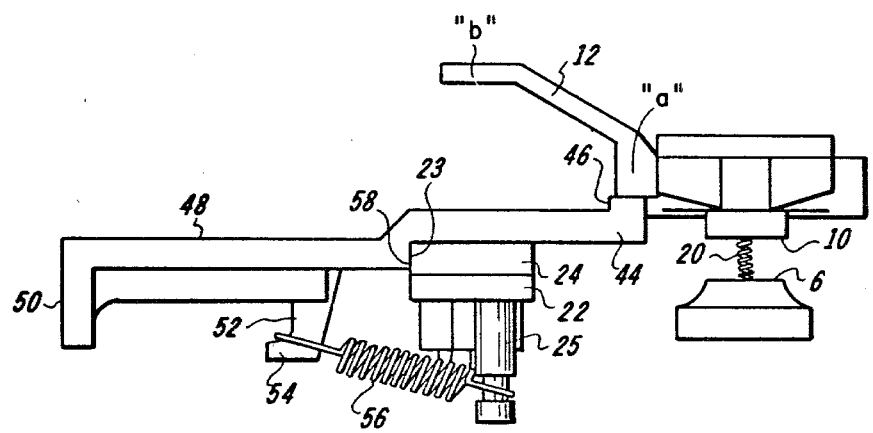
FIG. 3 is an end view (looking from the direction of disc insertion) of the portion of the disc drive of FIG. 1 with no disc insertion.

Referring first to FIGS. 1-3, the disc drive 2 includes a carriage 4 which supports a fixed button transducer head 6. Spaced apart from transducer head 6 is a low mass, relatively stiff cantilevered support arm 8 having thinned areal portions along its length for purposes of reducing weight without reducing rigidity. A transducer head 10 is supported by arm 8 in a position adjacent to transducer head 6. Arm 8 is provided with a tab portion 12 which extends upward and to one side of the main portion of arm 8. Transducer heads 6 and 10 may be of any conventional type, including a read/write core, an erase core and associated energizing leads.

Arm 8 is coupled to carriage 4 by a flat flexure spring 12 which is clamped or fastened to carriage 4 by screws 14 which extend through an upstop 16 and fastened to support arm 8 by screws 18. Flexure spring 12 may be of any conventional thickness and composition, such as, for example, stainless steel of 0.002 inch thickness. A tensioned spring 20 connected between carriage 4 and an adjacent portion of support arm 8 applied (in a conventional manner) a head load force to support arm 8 tending to move transducer head 10 toward transducer head 6. Positioned to one side of heads 6 and 10 is a platen 22 which provides partial support for the floppy disc when it is inserted into the drive. Platen 22 has a shoulder or raised portion 24 which limits the extent to which the floppy disc can be inserted into the drive.

In accordance with the invention, a lever interlock mechanism 30 is supported by platen 22 in a manner that will permit the lever interlock mechanism 30 to rotate about pivot point axis 32. Such pivotal movement may be accomplished by providing platen 22 with a bore or keyway 34 that communicates with the end of platen 22 by a slot 36 and by providing lever interlock mechanism 30 with a downwardly extending stem portion 38 which terminates in an enlarged section 40. Stem portion 38 is shaped such that it can be inserted and withdrawn from slot 36 only when interlock mechanism 30 is rotated to an extreme position beyond its normal operating positions as will be described hereinafter. Enlarged section 40 limits vertical movement of interlock mechanism 30.

Interlock mechanism 30 includes a generally flat body portion 42, a generally flat leg portion 44 having a plateau section 46, and a leg portion 48 including downwardly extending sections 50 and 52. Section 52 of leg portion 48 is provided with a shoulder 54 to which is connected one end of a tensioned spring 56 the other end of which is connected to a downwardly extending portion 25 of platen 22.

Spring 56 exerts a force on interlock mechanism 30 which holds wall 58 of the interlock mechanism in a position against wall 23 of platen 22. In that position, plateau section 46 of interlock mechanism 30 is vertically aligned with section "a" of tab portion 12 of support arm 8.

When the door latch (not shown) of the disc drive is in the open position the disc clamping assembly (not shown) of the disc drive is in a raised position. In that position, the disc clamping assembly contacts section "b" of tab portion 12 whereby support arm 8 is lifted away from fixed head 6 and contact between the heads 6 and 10 is prevented. When the door latch is closed (without disc insertion) the disc clamping assembly moves to a lowered position where it no longer contacts section "b" of tab portion 12. As a result, support arm 8 moves toward head 6 due to the load force exerted by spring 20. However, before the heads 6 and 10 can contact, section "a" of tab portion 12 comes into contact with plateau section 46 of the interlock mechanism 30. Thus, without disc insertion, heead 10 cannot lower sufficiently to contact head 6 and hence wringing of the heads and its deleterious effects are prevented.

Figure 5:
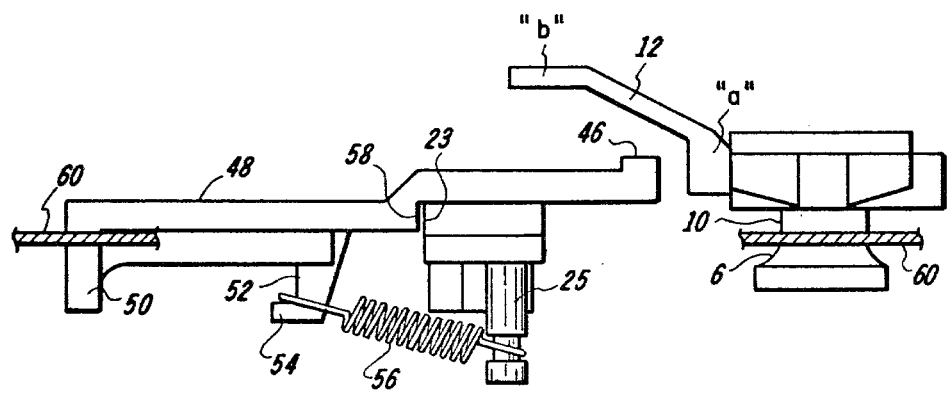
FIG. 5 is an end view as depicted in FIG. 3 but with disc insertion.
Figure 4:
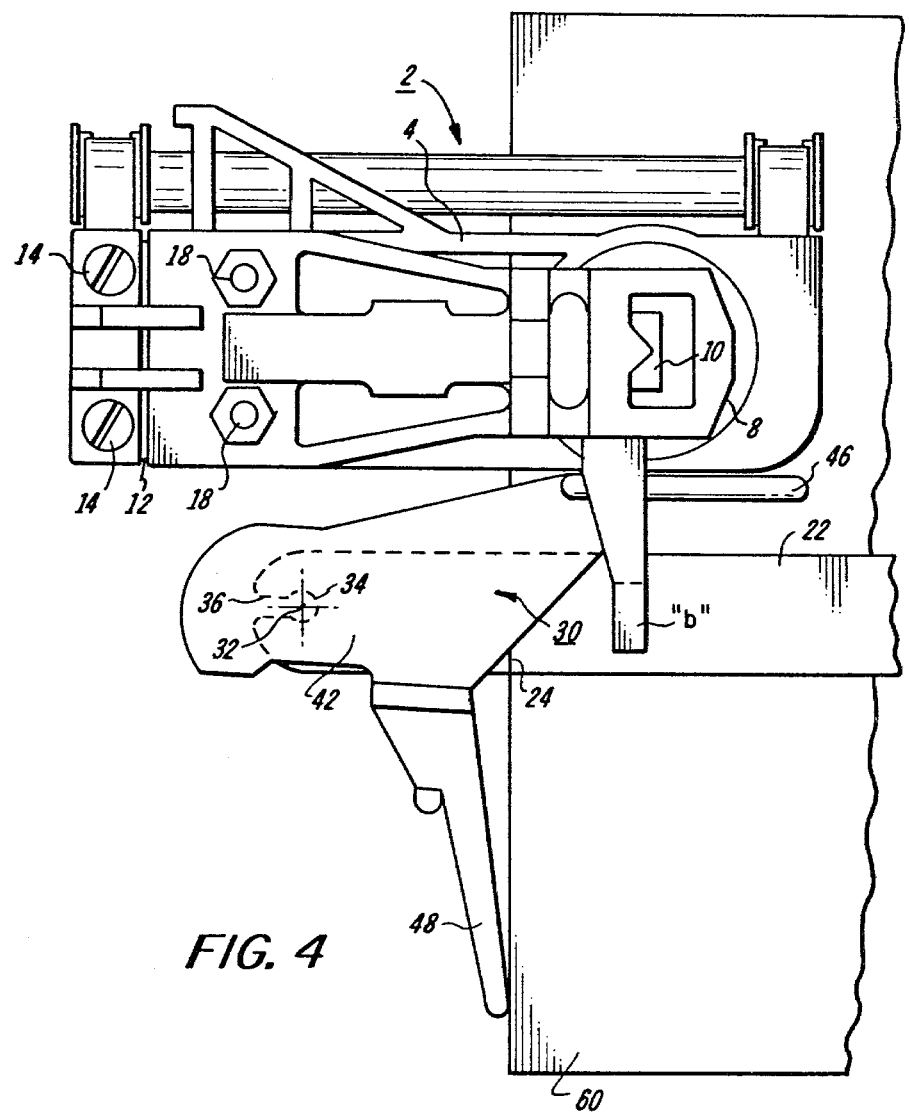
FIG. 4 is a top view of the portion of the disc drive depicted in FIG. 1 with disc insertion.

As shown in FIG. 4, when a disc 60 is inserted fully into the drive, the leading edge of the disc (actually the disc jacket) strikes downwardly extending section 50 of leg portion 48 before it contacts travel-limiting shoulder 24. As a result, the disc applies a force to interlock mechanism 30 causing it to rotate slightly (about ¼") in a clockwise direction to a position where plateau section 46 is no longer in vertical alignment with section "a" of tab portion 12 of support arm 8 (as shown in FIG. 5). Now, when the door latch is closed, there is nothing to prevent downward movement of support arm 8 and loading of the heads against the opposing surfaces of the disc 60.

Although the invention has been described in relation to a specific shape and rotational movement arrangement for the interlock mechanism, other shapes and movement arrangements are envisioned. For example, the interlock mechanism may ride on a spring loaded track, with the disc edge pushing the interlock mechanism backward to a neutral position and the spring pushing the interlock mechanism forward to a support position when the disc is removed, and leg 44 may be shortened and provided with a downwardly extending section so that it provides a contacting surface for the disc instead of leg section 50. Preferably, interlock mechanism 30 is made of plastic, although a metallic or alloy interlock or a wood interlock would operate successfully.

What is claimed is:

1. In a disc drive for recording data on, or read data from, a pliant magnetic disc, including at least one moveable transducer head and at least one fixed transducer head, and means for exerting a force on said moveable transducer head which force accomplishes loading of said heads upon opposite surfaces of a magnetic disc inserted therebetween, the improvement comprising a rotatable force biased head interlock mechanism including a first portion positioned in alignment with a secton of said at least one moveable transducer head when a magnetic disc is not inserted substantially fully into the disc drive whereby said heads cannot contact without a magnetic disc within the disc drive and a second portion positioned to be contacted by a magnetic disc when such magnetic disc is inserted substantially fully into the disc drive whereby the magnetic disc causes the head interlock mechanism to rotate such that said first portion of said interlock means is no longer aligned with said section of said at least one moveable transducer head whereby said heads can achieve their operating position, said head interlock mechanism returning under the action of the force bias to the position in which said first portion of said head interlock mechanism is in alignment with said section of said at least one moveable transducer head when a magnetic disc is not inserted substantially fully into the disc drive.

2. In a disc drive for recording data on, or reading data from, a pliant magnetic disc, including at least one fixed transducer head, at least one moveable transducer head mounted in a cantilevered manner, and means for exerting a force on said moveable transducer head which force accomplishes loading of said heads upon opposite surfaces of a magnetic disc inserted therebetween, the improvement comprising:
  rotatable head interlock means, said interlock means including a first portion positioned in alignment with a section of said at least one moveable transducer head when a magnetic disc is not inserted between the heads and a second portion positioned to be contacted by a magnetic disc when such magnetic disc is inserted substantially fully into the disc drive whereby the magnetic disc causes the interlock means to rotate such that said first portion of said interlock means is no longer in alignment with said section of said moveable transducer head.

3. In a disc drive for recording data on, or reading data from, a pliant magnetic disc, including at least one fixed transducer head, at least one moveable transducer head mounted in a cantilevered manner, and means for exerting a force on said moveable transducer head which force accomplishes loading of said heads upon opposite surfaces of a magnetic disc inserted therebetween, the improvement comprising:
  rotatable head interlock means, said interlock means including a first portion positioned in alignment with a section of said at least one moveable transducer head when a magnetic disc is not inserted between the heads and a second portion positioned to be contacted by a magnetic disc when such magnetic disc is inserted substantially fully into the disc drive whereby the magnetic disc causes the interlock means to rotate such that said first portion of said interlock means is no longer in alignment with said section of said moveable transducer head, said interlock means being spring biased toward the position in which said first portion of said interlock means is in alignment with said section of said at least one moveable transducer head whereby said interlock means returns to the position in which said first portion of said interlock means is in alignment with said section of said at least one moveable transducer head when the magnetic disc is not inserted substantially fully into the disc drive.

* * * * *